(12) United States Patent
Jyo et al.

(10) Patent No.: US 8,007,035 B2
(45) Date of Patent: Aug. 30, 2011

(54) FRONT STRUCTURE OF A VEHICLE BODY

(75) Inventors: Kou Jyo, Atsugi (JP); Koji Yasuda, Chigasaki (JP)

(73) Assignee: Nissan Motor Co., Ltd., Kanagawa (JP)

( * ) Notice: Subject to any disclaimer, the term of this patent is extended or adjusted under 35 U.S.C. 154(b) by 106 days.

(21) Appl. No.: 12/236,143

(22) Filed: Sep. 23, 2008

(65) Prior Publication Data
US 2009/0108631 A1   Apr. 30, 2009

(30) Foreign Application Priority Data
Oct. 26, 2007   (JP) ................................. 2007-279640

(51) Int. Cl.
*B60N 99/00*   (2006.01)
(52) U.S. Cl. ............... 296/193.09; 296/203.02; 293/115
(58) Field of Classification Search ............. 296/187.01, 296/187.09, 193.01, 193.09, 193.1, 193.11, 296/203.02; 293/115
See application file for complete search history.

(56) References Cited

U.S. PATENT DOCUMENTS

| | | | |
|---|---|---|---|
| 6,729,424 B2 * | 5/2004 | Joutaki et al. ................. | 180/68.4 |
| 7,008,008 B2 * | 3/2006 | Andre et al. ............. | 296/203.02 |
| 7,185,946 B2 * | 3/2007 | Cate et al. .................. | 296/193.09 |
| 7,331,413 B2 * | 2/2008 | Okai et al. ..................... | 180/68.4 |
| 7,560,003 B2 * | 7/2009 | Naughton et al. ............... | 156/91 |
| 2004/0084236 A1 * | 5/2004 | Okai et al. .................... | 180/68.4 |
| 2009/0146456 A1 * | 6/2009 | Saitou et al. ............. | 296/187.09 |

FOREIGN PATENT DOCUMENTS

| | | |
|---|---|---|
| DE | 10260518 A1 | 9/2004 |
| EP | 1048520 | 11/2000 |
| EP | 1481878 | 12/2004 |
| JP | 2003-306168 | 10/2003 |

OTHER PUBLICATIONS

Patent Abstracts of Japan, Publication No. 2003-306168, Publication Date Oct. 28, 2003, 1 page.
European Search Report for European Application No. 08167062.2-1268, dated Apr. 24, 2009 (11 pages).
English patent abstract of EP1048520 from esp@cenet published Nov. 2, 2000 (1 page).
English patent abstract of DE10260518 from esp@cenet published Sep. 30, 2004 (1 page).
Office Action in European Patent Application No. 08 167 062.2, dated Mar. 1, 2011 (8 pages).

* cited by examiner

*Primary Examiner* — Lori Lyjak
(74) *Attorney, Agent, or Firm* — Osha • Liang LLP

(57) ABSTRACT

A structure of a vehicle body is provided with an upper radiator support disposed in an upper front area of an engine compartment and an upper member supported by the upper radiator support. The upper member is disposed between the upper radiator support and a front portion of a hood covering the upper portion of the engine compartment. The upper member is provided with a main body portion extending along a lateral direction of a vehicle at an upper portion of the upper radiator support, a leg portion extending downwardly from each lateral end of the main body portion, and a hood lock disposed between the leg portions. Lower ends of the leg portions are coupled to the upper radiator support.

18 Claims, 4 Drawing Sheets

FRONT STRUCTURE OF A VEHICLE BODY

CROSS-REFERENCE TO RELATED APPLICATIONS

The present application claims priority from Japanese Patent Application No. 2007-279640, filed Oct. 26, 2007. The contents of the priority application are hereby incorporated by reference in their entirety.

BACKGROUND OF THE DISCLOSURE

1. Field of the Disclosure

The present disclosure relates to a front structure of a vehicle body having a radiator core support disposed in the front portion of an engine compartment.

2. Description of the Related Art

Conventionally, it has been known to provide a support brace to support a hood lock of a vehicle, the hood lock support brace is generally positioned rearward of a radiator, which is generally located in the front portion of an engine compartment of the vehicle body. The hood lock support brace connects the hood lock, which is positioned at an upper portion of the engine compartment to a front cross member extending along the lateral direction of a vehicle at a lower portion of the engine compartment (see Japanese Laid-Open Patent Publication No. 2003-306168).

A bent member is installed at a lower portion of the hood lock support brace. When an external impact is exerted upon the front of the hood, the impact energy is absorbed by deforming the bent member.

However, when the hood lock support brace is disposed at the rear of the radiator in accordance with the conventional structure, a layout space in the engine compartment for accommodating various components may be adversely affected.

SUMMARY OF THE CLAIMED SUBJECT MATTER

In one aspect, the present disclosure relates to a structure of a vehicle body, including an upper radiator support disposed in an upper front area of an engine compartment, and an upper member supported by the upper radiator support, the upper member disposed between the upper radiator support and a front portion of a hood covering the upper portion of the engine compartment, wherein the upper member includes a main body portion extending along a lateral direction of a vehicle at an upper portion of the upper radiator support, and a leg portion extending downwardly from each lateral end of the main body portion, wherein lower ends of the leg portions are coupled to the upper radiator support.

In another aspect, the present disclosure relates to a vehicle body including an engine compartment, a hood configured to cover the an opening of the engine compartment, an upper radiator support coupled to a forward portion of the engine compartment, an upper member supported by the upper radiator support, the upper member disposed between the upper radiator support and a forward portion of the hood, and a hood lock supported by the upper member, wherein the hood lock is configured to retain the hood in a closed position about the opening of the engine compartment, wherein the upper member includes a main body extending along a lateral direction of the vehicle body at an upper portion of the upper radiator support, and a leg member extending downwardly from the main body, wherein a lower end of the leg member is coupled to the upper radiator support.

In another aspect, the present disclosure relates to a vehicle body including an engine compartment, a means for covering the engine compartment, an upper means for supporting a radiator coupled at a forward portion of the engine compartment, an upper member supported by the upper means for supporting the radiator, the upper member disposed between the upper radiator support and a forward portion of the hood, and a locking means for retaining the means for covering the engine compartment in a closed position, wherein the locking means is supported by the upper member, wherein the upper member includes a main body means for extending along a lateral direction of the vehicle body at an upper portion of the means for supporting the radiator, and a leg means for extending downwardly from the main body means, wherein a lower end of the leg means is coupled to the upper means for supporting the radiator.

In another aspect, the present disclosure relates to a method to construct an engine compartment including coupling an upper radiator support to a forward portion of the engine compartment, coupling an upper support member between the upper radiator support and a forward portion of the hood, extending a main body of the upper support member along a lateral direction of the engine compartment, extending a leg member downward from the main body to the upper radiator support, coupling a lower end of the leg portion to the upper radiator support, providing a hood to cover an upper portion of the engine compartment, providing a hood lock upon the main body, and latching the hood in a closed position with the hood lock.

BRIEF DESCRIPTION OF DRAWINGS

Features of the present disclosure will become more apparent from the following description in conjunction with the accompanying drawings.

DETAILED DESCRIPTION

Embodiments of the present disclosure will be explained based on the provided drawings.

Figure 1:
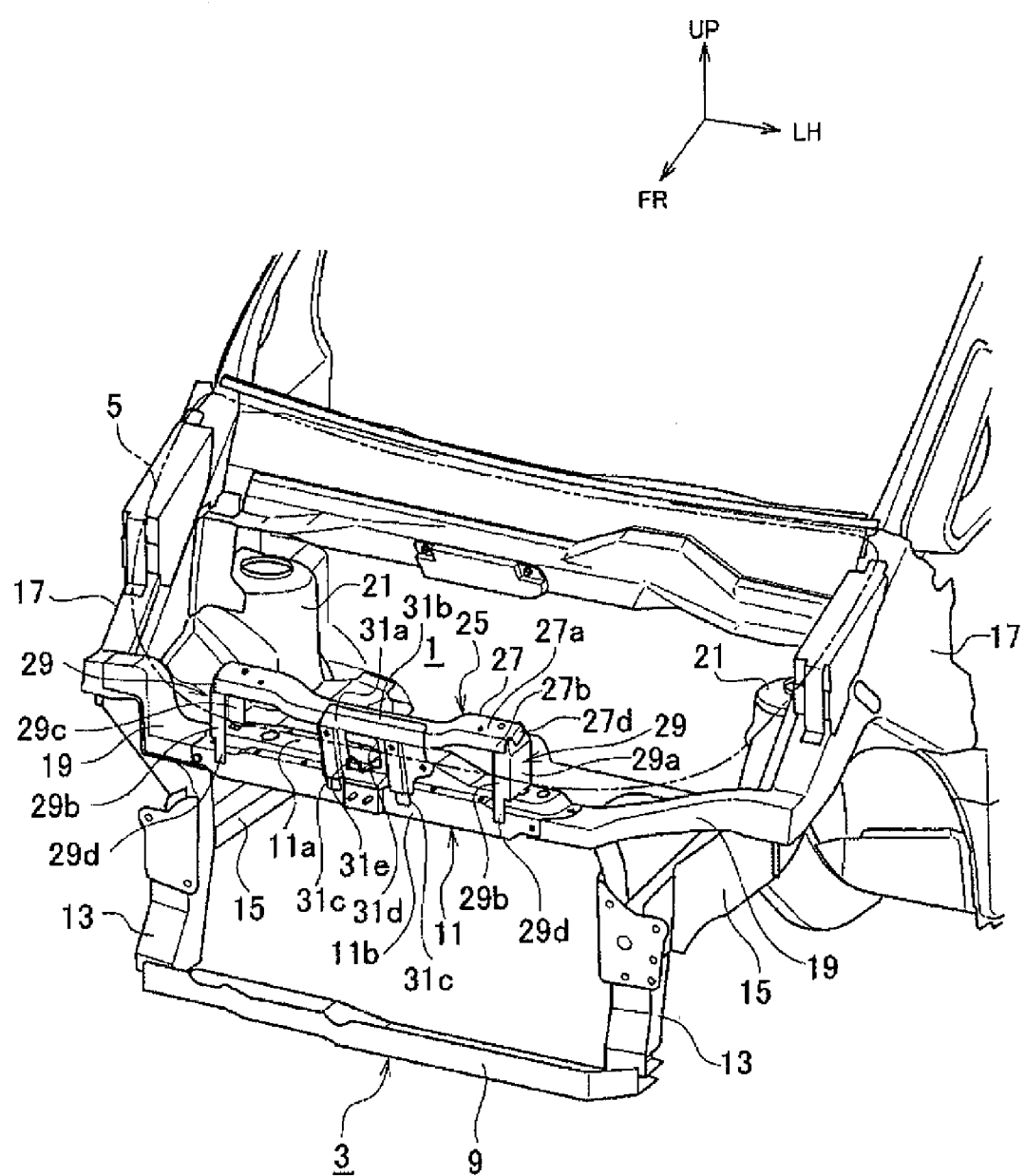
FIG. 1 is a perspective view of a front structure of a vehicle body in accordance with one embodiment of the present disclosure.
Figure 2:
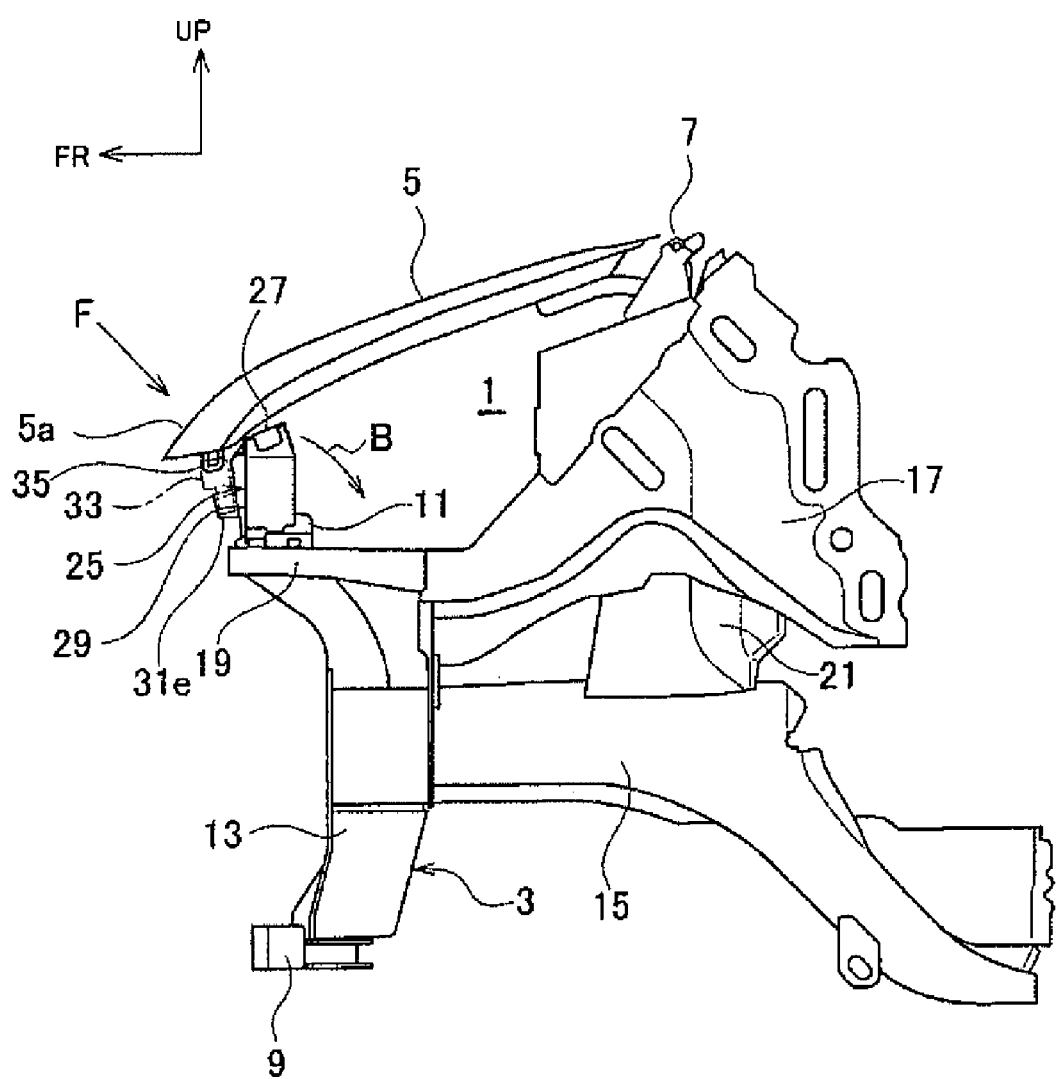
FIG. 2 is a side view of the front structure of the vehicle body shown in FIG. 1.

FIG. 1 is a perspective view of a front structure of a vehicle body in accordance with an embodiment of the present disclosure. FIG. 2 is a side view thereof. Further, in the drawings, an arrow FR indicates a forward direction of the vehicle body, while an arrow UP indicates an upward direction of the vehicle body. Further, an arrow LH indicates a leftward direction of the vehicle body.

In the front of an engine compartment 1 located at a front of the vehicle, a radiator core support 3 configured to support a radiator (not shown) may be installed. A hood 5 configured to selectively cover an upper portion of the engine compartment 1 may be opened and closed from a front side 5a by a hinge 7 installed in a rear portion of the engine compartment 1.

As shown, radiator core support 3 includes: a radiator core support lower member 9 extending along the lateral direction (i.e., along axis LH) of the vehicle at a lower portion of the radiator core support 3; a radiator core support upper member 11 extending along the lateral direction of the vehicle at an upper portion of the radiator core support 3; and right and left radiator core support side members 13 connecting both ends of the radiator core support lower member 9 and the radiator core support upper member 11.

A front side member 15 is shown extending approximately from the middle of the right and left radiator core support side members 13 toward the rear of the vehicle body. Further, a hood ledge 17 may be positioned at an upper and outer side position of the front side member 15. A connecting member 19 may connect a front portion of the hood ledge 17 to both ends of the radiator core support upper member 11.

A strut tower 21 may be installed on an inner wall of the hood ledge 17 at a side of the engine compartment 1. A lower portion of the strut tower 21 may be connected to the front side member 15.

Figure 3:
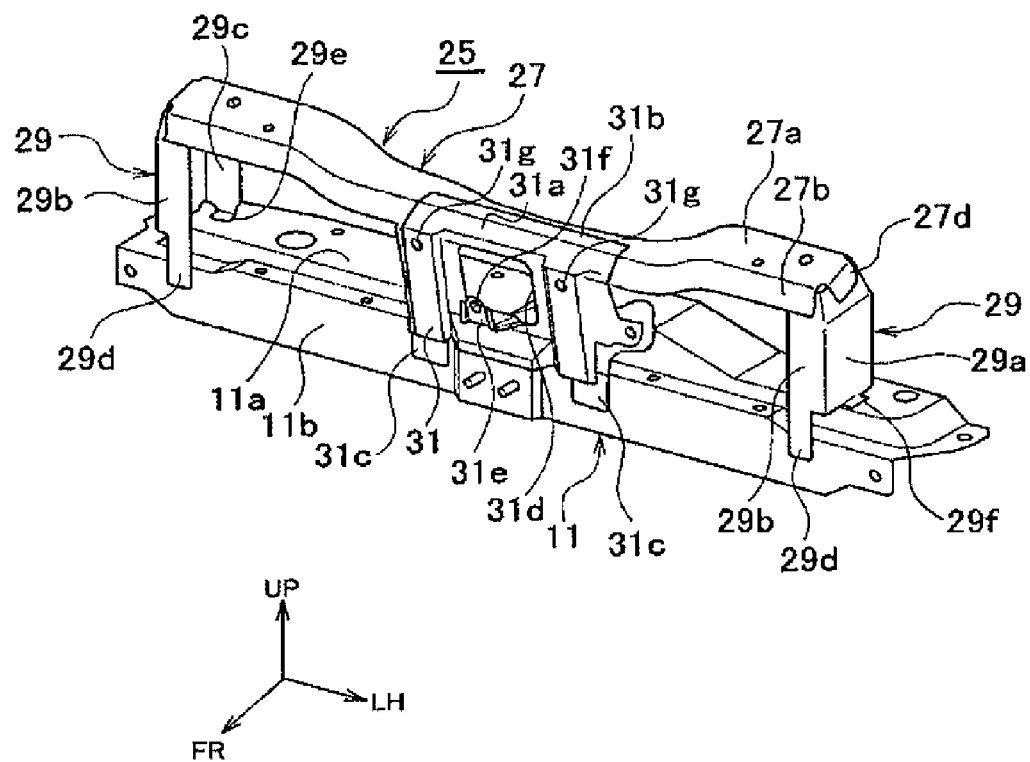
FIG. 3 is a perspective view showing an upper portion member located at the front of an engine compartment with a radiator core support upper member.
Figure 4:
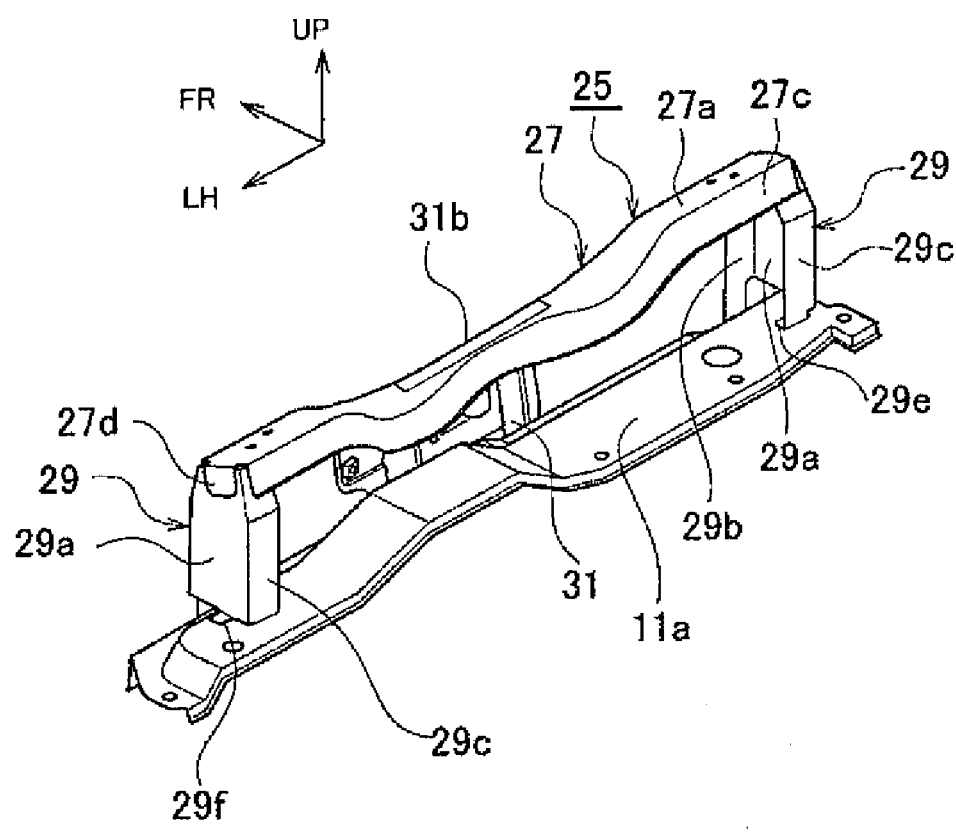
FIG. 4 is a perspective view of the structure shown in FIG. 3 when viewed from a rear of the vehicle body.

Further, an upper portion member 25 at the front of the engine compartment may be installed on the radiator core support upper member 11. The upper portion member 25 may be positioned between the radiator core support upper member 11 and a front 5a of the hood 5. FIG. 3 is a perspective view showing the upper portion member 25 located at the front of the engine compartment with the radiator core support upper member 11. FIG. 4 is a perspective view of the structure shown in FIG. 3 when seen from the rear of the vehicle body.

The upper portion member 25 at the front of the engine compartment may include: a main body portion 27 extending along the lateral direction of the vehicle at an upper area of the radiator core support upper member 11; and right and left leg members 29 extending downwardly from both ends of the main body portion 27 to couple a lower portion thereof to the radiator core support upper member 11.

The leg member 29 may include an outer side portion 29a, a front portion 29b and a rear portion 29c arranged to form a U-shaped cross-section, wherein an open area of the leg member is arranged to be in the lateral direction of the vehicle. The front portion 29b may extend lower than an upper surface portion 11a of the radiator core support upper member 11. Further, the leg member 29 may include a front surface bonded portion 29d is bonded to a front surface portion 11b of the radiator core support upper member 11.

A lower end of the rear portion 29c of the leg member 29 is a flange 29e, which may be bent toward the front of the vehicle body and bonded to the upper surface portion 11a of the radiator core support upper member 11. Further, a lower end of the outer side portion 29a of the leg member 29 may comprise a flange 29f, which may be bent toward an outer side of the lateral direction of the vehicle and bonded to the upper surface portion 11a of the radiator core support upper member 11.

The flange 29e may be bent toward the rear side of the vehicle body, thereby allowing the flange 29f to be bent toward an inner side of the lateral direction of the vehicle.

The flanges 29e and 29f may form an upper surface bonded portion, which may be bonded to the upper surface portion 11a of the radiator core support upper member 11. Thus, a lower portion of the leg member 29 may include the upper surface bonded portion (flanges 29e and 29f), which may be bonded to the upper surface portion 11a of the radiator core support upper member 11. It also includes the front surface bonded portion 29d, which is bonded to the front surface portion 11b of the radiator core support upper member 11.

The main body portion 27 connected to the upper portion of the leg member 29 may include an upper surface 27a, a front surface 27b and a rear surface 27c to have a generally U-shaped cross-section, wherein a lower direction of the vehicle is opened. Both ends of the main body portion 27 in the lateral direction of the vehicle are coupled to cover the upper ends of the leg member 29.

That is, an area around both ends of the front surface 27b in the lateral direction of the vehicle is bonded to the upper portion of the front portion 29b of the leg member 29. Further, an area around both ends of the rear surface 27c in the lateral direction of the vehicle may be bonded to the upper portion of the rear portion 29c of the leg member 29. Also, a flange 27d may be formed by bending an end of the upper portion 29a along the lateral direction of the vehicle toward a lower direction and may be bonded to an upper portion of the outer side portion 29a of the leg member 29.

However, as shown in FIG. 2, the upper surface 27a of the main body portion 27 may be inclined with respect to a horizontal plane. As such, a front side of the vehicle body may be lower than a rear side of the vehicle body to approximately conform to an inclined angle of the hood 5 when in a closed state.

Further, a middle portion of the main body portion 27 along the lateral direction of the vehicle may be connected to a middle portion of the radiator core support upper member 11 along the lateral direction of the vehicle via a reinforcing member 31. The reinforcing member 31 may include bent portions 31a and 31b wherein an upper portion of the reinforcing member 31 is bent toward a rear direction in an orderly manner. The bent portions 31b may be bonded to the upper surface 27a of the main body portion 27. Further, a lower portion flange 31c may be bonded to the front surface portion 11b of the radiator core support upper member 11 wherein the lower portion flange 31c is formed by downwardly extending the vicinity around both ends in the lateral direction of the vehicle at the lower portion.

Additionally, the reinforcing member 31 includes an opening 31d at its middle and a hood lock installation 31e in an approximately L-shape when viewed from a side protruding from a lower edge of the opening 31d toward the front side of the vehicle body. A hood lock 33 configured to close and lock the hood 5 may be installed in the hood lock installation 31e. As shown in FIG. 2, a striker 35 installed at a side of the hood 5 is coupled with the hood lock 33 to provide a locking state.

Although FIGS. 1 and 3 do not show the hood lock 33, the hood lock 33 may be installed in the reinforcing member 31 by using an installing hole 31f formed in the hood lock installation 31e and two installing holes 31g formed in the upper portion at both sides of the reinforcing member.

In the front structure of the vehicle body, when an impact is exerted from an inclined upper direction of the front of the vehicle body to the front 5a of the hood 5 (as indicated by an arrow F), the impact may be delivered from the front 5a of the hood 5 via the hood lock 33 and the reinforcing member 31 to the main body portion 27 of the upper member 25 located at the front of the engine compartment. Further, the impact may be delivered via the leg portions 29 at both ends of the main body portion 27 to the radiator core support upper member 11.

Because the impact is exerted upon the upper member 25 in the front of the engine compartment along the direction indicated by the arrow F in FIG. 2, a force along a falling direction indicated by an arrow B in FIG. 2 may be exerted upon the main body portion 27 having the lower portion of the leg member 29 as a support point. Because the front surface bonded portion 29d at the lower portion of the leg member 29 may be bonded to the front surface portion 11b of the radiator core support upper member 11, the bonded portion may easily separate from the load exerted along the direction of the arrow B.

As a result, because the upper member 25 at the front of the engine compartment may easily fall in the direction indicated by the arrow B, it may be possible to effectively absorb the impact energy exerted from the inclined upper direction of the front of the vehicle body to the front 5a of the hood 5.

According to embodiments disclosed herein, the upper member 25 at the front of the engine compartment configured to absorbing the impact energy exerted upon the hood 5 from the inclined upper direction of the front of the vehicle body may be disposed between the hood 5 and the radiator core support upper member 11. Thus, it may not be necessary to provide a space in the engine compartment 1 to absorbing the impact energy, thereby preventing the layout in the engine compartment 1 from being adversely affected.

Further, the upper member 25 at the front of the engine compartment (which may act as an impact energy absorber) may be disposed at the upper portion of the radiator core support upper member 11. By doing so, it may be more effective in a vehicle having a relatively high hood 5 height.

The upper member 25 at the front end of the engine compartment (which may act as an impact energy absorber) may be disposed at the upper direction of the radiator provided on the radiator core support 3. Thus, radiator ventilation may be increased compared to a structure of disposing the impact energy absorber at the rear or front of the radiator. As such, it may be possible to improve the cooling effect.

Further, although the hood 5 may be opened and closed from the front 5a by the hinge 7, when the hood 5 is changed to a closed state from an opened state, a dead weight load may be exerted downwardly with respect to the hood lock 33.

A closing load of the hood 5 exerted upon the hood lock 33 may be received by the reinforcing member 31 and dispersed via the main body portion 27 into the right and left leg portions 29 while being transferred to the upper surface portion 11a of the radiator core support upper member 11 via the flanges 29e and 29f along a vertical direction. As such, it may be possible to suppress reinforcement around an installing portion of the hood lock 33 as low as possible. That is, a weight increase may be suppressed by minimizing the reinforcing countermeasure such as increasing the plate thickness of the reinforcing member 31.

Further, according to embodiments disclosed herein, the leg member 29 may be formed at both ends of the main body portion 27 in the lateral direction of the vehicle. Thus the upper portion member 25 in the front end of the engine compartment may comprise a generally U-shaped cross section. As such, the closing load of the hood 5 may be effectively received by the left and right leg portions 29.

As described above, the upper surface 27a of the main body portion 27 approximately conforms to the inclination of the hood 5 in the closed state. Further, a bumper rubber (not shown) configured to receive the hood 5 may be established around the right and left ends of the inclined main body portion 27. As such, the closing load of the hood 5 may be effectively transferred via the bumper rubber to the upper surface 27a of the main body portion 27.

Further, the lower portion of the leg member 29 may be bonded to the front surface portion 11b at the front side of the vehicle body of the radiator core support upper 11. Thus, the bonded portion may easily be separated when the impact energy is exerted from the inclined upper direction of the front of the vehicle body to the front end 5a of the hood 5, thereby absorbing the impact energy.

The lower portion of the leg member 29 may include the upper surface bonded portion (flanges 29e and 29f), which may be bonded to the upper surface portion 11a of the radiator core support upper member 1. It also may include the front surface bonded portion 29d, which is bonded to the front surface portion 11b of the radiator core support upper member 11. The lower portion of the leg member 29 may receive the closing load of the hood 5 and may absorb the impact energy from the inclined upper direction of the front of the vehicle body by the right and left leg portions 29.

Further, because the hood lock 33 configured to lock the hood 5 between the leg portions 29 of the main body portion 27 in a closed state may be disposed, the closing load of the hood 5 may be dispersed via the main body portion 27 to the right and left leg portions 29.

According to embodiments of the present disclosure, because the hood lock 33 may be installed in the reinforcing member 31 configured to connect the main body portion 27 and the radiator core support upper 11, it may be possible to effectively transfer the closing load of the hood 5 via the reinforcing member 31 to the radiator core support upper member 11.

Further, the flange 31c may be installed at the lower portion of the reinforcing member 31 is bonded to the front surface portion 11b at the front side of the vehicle body of the radiator core support upper member 11. Thus, when the impact energy is exerted from the inclined upper direction of the vehicle body front to the hood 5, the bonded portion may easily be separated similar to the front surface bonded portion 29d of the leg member 29. Also, although the reinforcing member 31 is installed, the upper member 25 at the front of the engine compartment may easily fall toward the rear direction to thereby secure the impact absorbing function.

Advantageously, embodiments of the present disclosure may be configured such that they effectively absorb an external impact exerted on the front of a hood but do not adversely affect the special layout of the engine compartment.

Embodiments of the present disclosure may comprise an upper member at a front of an engine compartment disposed on a radiator core support upper member. The upper member may be positioned between the radiator core support upper member and the front of the hood. The upper member may include a main body portion extending along a lateral direction of the vehicle and may be disposed at an upper position of the radiator core support upper member. The upper member may further include a leg portion connected to the main body portion with a lower portion coupled to the radiator core support upper member.

Accordingly, when an impact is exerted upon a front of a hood from an upper front portion of the vehicle body, the upper member may displace toward the engine compartment so as to effectively absorb such an impact energy. Because the upper member (which may act as an impact absorber) may be located at the upper portion of the radiator core support upper member, it may not be necessary to provide a space for installing an impact absorber in the engine compartment.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A structure of a vehicle body, comprising:
   an upper radiator support disposed in an upper front area of an engine compartment;
   a lower radiator support disposed in a lower front area of an engine compartment;
   a left side support member and a right side support member connecting left and right lateral ends of the upper radiator support and the lower radiator support; and an upper member supported by the upper radiator support, the upper member disposed between the upper radiator support and a front portion of a hood covering the upper portion of the engine compartment;
wherein the upper member comprises:
a main body portion extending along a lateral direction of a vehicle at an upper portion of the upper radiator support;
a leg portion extending downwardly from each lateral end of the main body portion; and
a hood lock disposed on the main body portion between the leg portions to lock the hood in a closed state, and
wherein lower ends of the leg portions are coupled to the upper radiator support.

2. The structure of claim 1, wherein the lower ends are in bonding connection to a front surface portion of the upper radiator support.

3. The structure of claim 2, wherein each lower end comprises an upper surface attachment configured to couple to an upper portion of the upper radiator support.

4. The structure of claim 2, wherein a front surface attachment portion of each lower end is coupled to the front surface portion of the upper radiator support.

5. The structure of claim 1, wherein the hood lock is installed upon a reinforcing member configured to interconnect the main body portion and the upper radiator support.

6. The structure of claim 5, wherein a lower portion of the reinforcing member is coupled to the front surface portion of the upper radiator support.

7. A vehicle body, comprising:
an engine compartment;
a hood configured to cover an opening of the engine compartment;
an upper radiator support coupled to a forward portion of the engine compartment;
a lower radiator support coupled to a forward portion of the engine compartment;
a left side support member and a right side support member connecting left and right lateral ends of the upper radiator support and the lower radiator support;
an upper member supported by the upper radiator support, the upper member disposed between the upper radiator support and a forward portion of the hood; and
a hood lock supported by the upper member, wherein the hood lock is configured to retain the hood in a closed position about the opening of the engine compartment;
wherein the upper member comprises:
a main body extending along a lateral direction of the vehicle body at an upper portion of the upper radiator support; and
a leg member extending downwardly from each lateral end of the main body;
wherein a lower end of the leg member is coupled to the upper radiator support, and
wherein the hood lock is disposed on the main body between the leg members.

8. The vehicle body of claim 7, wherein the lower end is in bonding connection to a front portion of the upper radiator support.

9. The structure of claim 7, wherein the hood lock is installed upon a reinforcing member configured to interconnect the main body and the upper radiator support.

10. The structure of claim 9, wherein a lower portion of the reinforcing member is coupled to a front surface portion of the upper radiator support.

11. A vehicle body, comprising:
an engine compartment;
a means for covering the engine compartment;
an upper means for supporting a radiator coupled at a forward portion of the engine compartment;
a lower means for supporting a radiator coupled at a forward portion of the engine compartment;
a left side means for supporting a radiator and a right side means for supporting a radiator connecting left and right lateral ends of the upper means for supporting a radiator and the lower means for supporting a radiator;
an upper member supported by the upper means for supporting the radiator, the upper member disposed between the means for supporting a radiator and a forward portion of the means for covering the engine compartment; and
a means for locking retaining the means for covering the engine compartment in a closed position, wherein the means for locking is supported by the upper member;
wherein the upper member comprises:
a means for extending along a lateral direction of the vehicle body disposed at an upper portion of the means for supporting the radiator; and
a means for extending downwardly disposed at each lateral end of the means for extending along a lateral direction of the vehicle body;
wherein a lower end of the means for extending downwardly is coupled to the means for supporting the radiator, and
wherein the means for locking is disposed on the means for extending along a lateral direction of the vehicle body between the means for extending downwardly.

12. The vehicle body of claim 11, wherein the lower end of the means for extending downwardly is in bonding connection to a front portion of the means for supporting the radiator.

13. The structure of claim 11, wherein the means for locking is installed upon a means for reinforcing interconnecting the means for extending along a lateral direction of the vehicle body and the means for supporting the radiator.

14. The structure of claim 13, wherein a lower portion of the means for reinforcing is coupled to a front surface portion of the means for supporting the radiator.

15. A method to construct an engine compartment, the method comprising:
coupling a radiator support to a forward portion of the engine compartment
wherein the radiator support comprises an upper radiator support and a lower radiator support, and
wherein a left side support member and a right side support member connect left and right lateral ends of the upper radiator support and the lower radiator support;
coupling an upper support member between the radiator support and a forward portion of a hood covering an upper portion of the engine compartment;
extending a main body of the upper support member along a lateral direction of the engine compartment;
extending a leg member downward from each lateral end of the main body to the radiator support;
coupling a lower end of the leg member to the upper radiator support;
providing a hood lock upon the main body disposed on the main body between the leg members; and
latching the hood in a closed position with the hood lock.

16. The method of claim 15, further comprising bonding the lower end of the leg member to a front portion of the upper radiator support.

17. The method of claim 15, further comprising installing the hood lock upon a reinforcing member configured to interconnect the main body and the upper radiator support.

18. The method of claim 17, further comprising coupling a lower portion of the reinforcing member to a front surface portion of the upper radiator support.

* * * * *